Jan. 23, 1962
H. STOLPER
3,017,806
EYEGLASS FRAMES OF THE SEMI-RIMLESS TYPE
Filed March 15, 1960
2 Sheets-Sheet 1
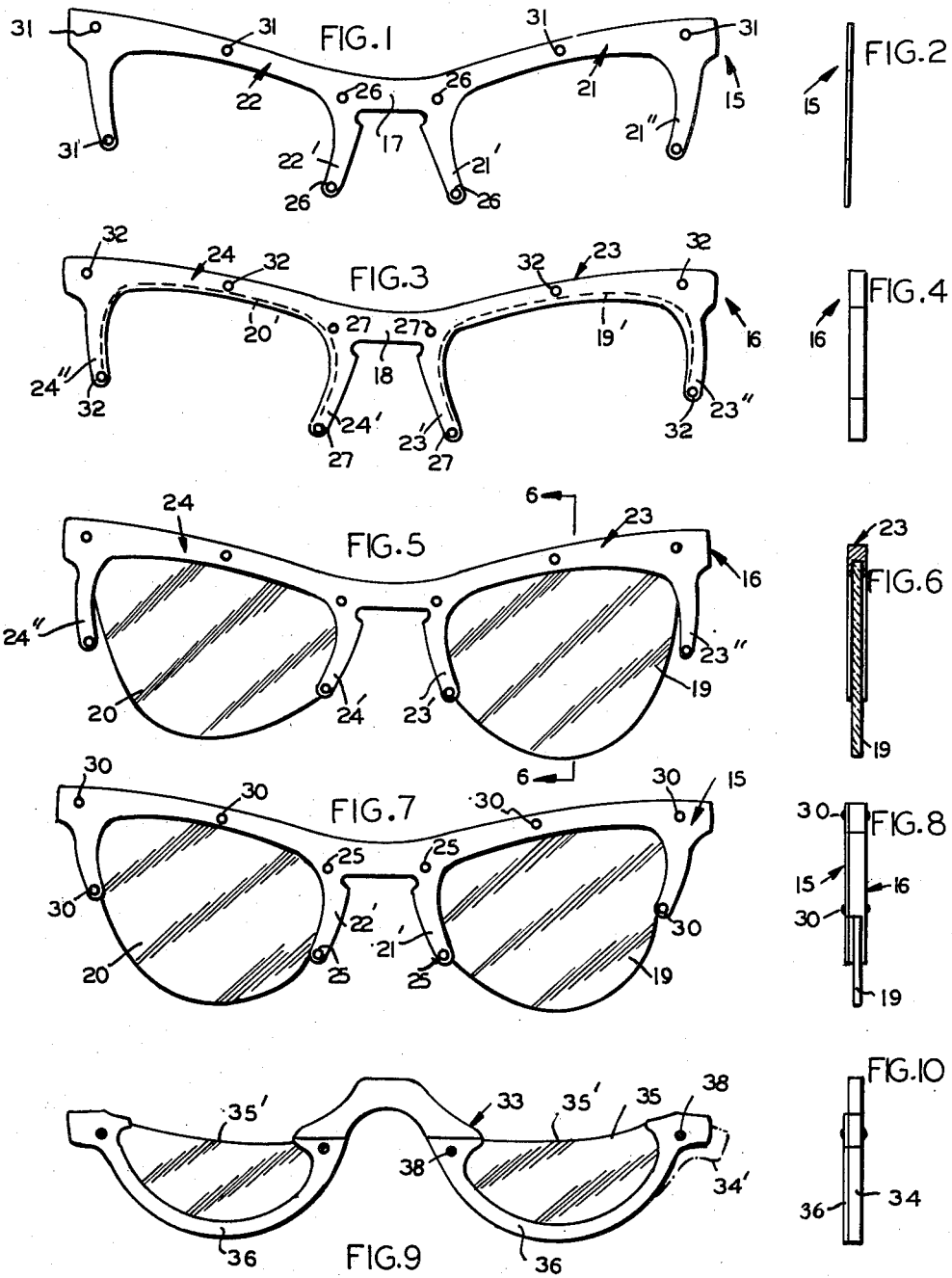
INVENTOR,
HARRY STOLPER,
BY
ATTORNEY Jan. 23, 1962     H. STOLPER     3,017,806
EYEGLASS FRAMES OF THE SEMI-RIMLESS TYPE
Filed March 15, 1960     2 Sheets-Sheet 2

INVENTOR,
HARRY STOLPER,
BY
ATTORNEY.

United States Patent Office 3,017,806
Patented Jan. 23, 1962

3,017,806
EYEGLASS FRAMES OF THE SEMI-RIMLESS TYPE
Harry Stolper, New York, N.Y., assignor to Stolper & Voice Optical Co., Inc., New York, N.Y., a corporation of New York
Filed Mar. 15, 1960, Ser. No. 15,116
8 Claims. (Cl. 88—41)

The present invention relates to eyeglass frames and more particularly to the semi-rimless type.

An object of this invention is to provide a novel and improved eyeglass frame of the semi-rimless type, in which the lenses are easily and securely mounted without any pin or screw or other means through them and nothing is done to the lenses to offer attachment or securing means therefor.

Another object thereof is to provide a novel and improved eyeglass frame of the character mentioned, which is simple in construction, reasonably cheap to manufacture, easy to assemble, which avoids any machining of the glass other than to bring the blank to its required contour in normal manner, and which is efficient in carrying out the purposes for which it is designed.

Other objects and advantages will become apparent as this disclosure proceeds.

Essentially, for the practice of this invention, the frame includes a central nose piece or bridge having a substantially U-shaped half bezel at each side to carry the lenses. The U-shape may be for around either the upper or the lower part of the rim of a lens as is illustrated in the accompanying drawing. This frame member is made of plastic or of other suitable material having some resilient quality. For each of said U-pieces, there is a U-piece of non-resilient material, of such rigidity that it will not bend under the conditions it is subjected to, as will be described. These non-resilient U-pieces may be separate or they may be joined by a nose piece, and they may be of a rigid sheet metal. In each of them, the arms must be convergent towards their distal ends. The arms of each resilient U-shape must be in such angular relation that their distal ends need be bent towards each other so that the resilient U-shape shall conform to the fixed shape of the non-resilient U-piece which is to be superposed on a face of a resilient U-shape. The superposed U-shapes are provided with suitable spaced holes which register when said U-pieces are congruent and screws or rivets are set through such pairs of aligned holes to maintain the assembly to hold a lens whose contour conforms with that of the non-resilient U-shape. The shape of the resilient frame member must be such that when the non-resilient component or components are attached thereto, it will have the shape and dimensions which the frame requires.

In the accompanying drawing forming part of this specification, similar characters of reference indicate corresponding parts in all the views.

FIG. 1 is a front view of a non-resilient member which is taught for the practice of this invention.

FIG. 2 is an end view of FIG. 1.

FIG. 3 is a front view of the resilient frame member to be associated with the item shown in FIG. 1, after lenses are set thereon.

FIG. 4 is an end view of FIG. 3.

FIG. 5 is a front view of the resilient member provided with lenses in its half bezels; the contour of said lenses being in conformity with the non-resilient member shown in FIG. 1.

FIG. 6 is a section taken at line 6—6 in FIG. 5.

FIG. 7 is a front view of the complete eyeglasses.

FIG. 8 is an end view of FIG. 7.

FIG. 9 shows the front view of a modified embodiment of this invention, wherein the non-resilient U-shapes are separate pieces, whereas the embodiment shown in the previous view, has its non-resilient U-shapes one piece with a nose piece.

FIG. 10 is an end view of FIG. 9.

Figure 11:
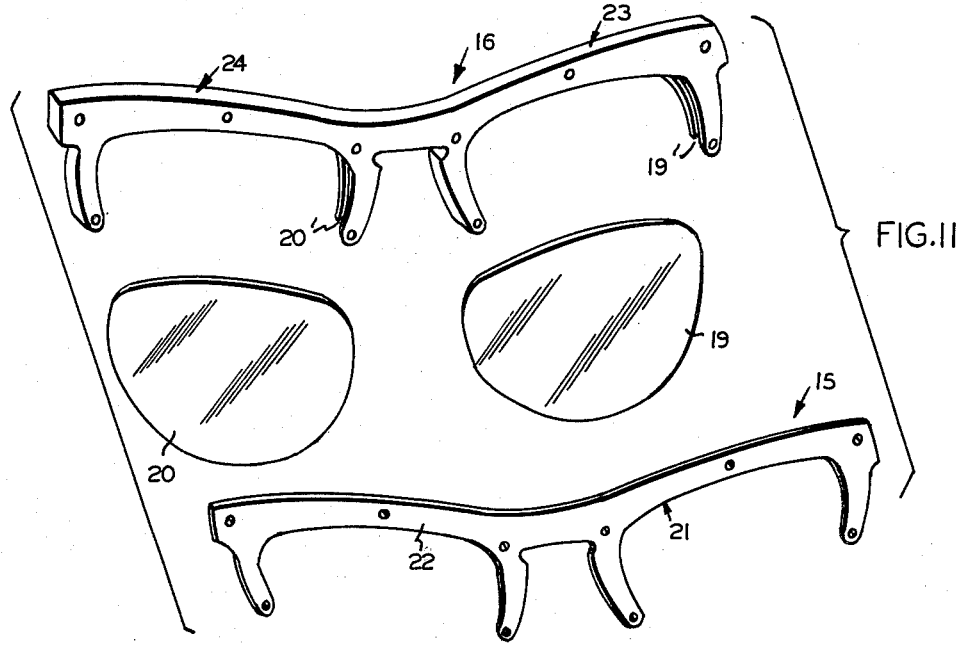
FIG. 11 is an exploded perspective view of the parts comprising FIG. 7.
Figure 12:
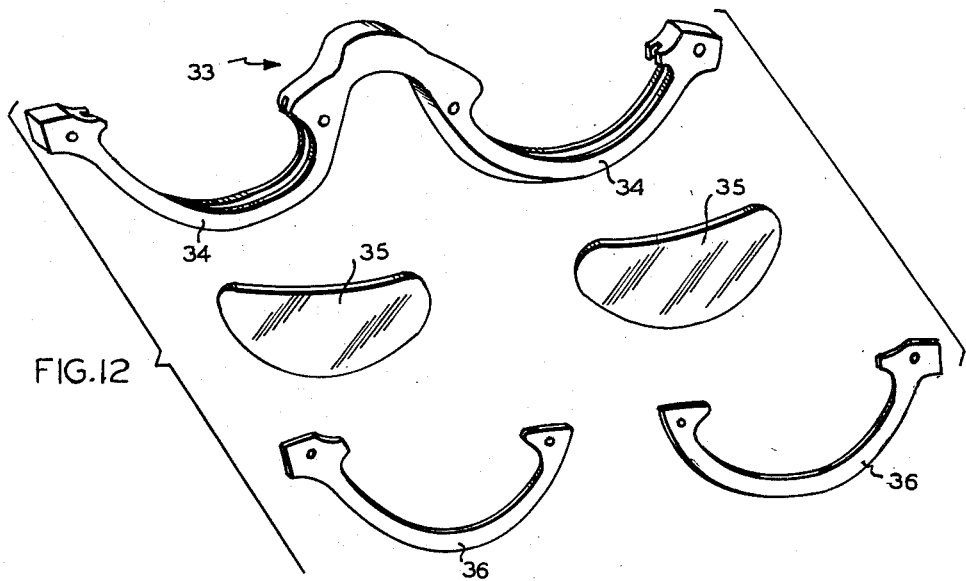
FIG. 12 is an exploded perspective view of the parts comprising FIG. 9.

In the drawing, the eyeglass frame of the temple type, consists of the two parts which are designated generally by the numerals 15 and 16 respectively. The part 15 is of non-resilient material and may be made of stiff sheet metal to comprise a central nose piece or bridge 17 having a substantially U-shaped element at each side. The shape of this part 15 is the desired frame shape. The part 16 may be of plastic or other suitable material having some resilient quality, and it comprises a nose piece 18 having a substantially U-shaped half bezel at each side to carry the lenses 19, 20 respectively, in the lens rim-receiving channels 19', 20'. The U-shapes of the part 15 are denoted generally by the numerals 21, 22 respectively. The U-shapes of the part 16 are denoted generally by the numerals 23, 24 respectively. The arms 21', 22' and the bridge 17 of the part 15, are identical in shape respectively with the arms 23', 24' and the bridge 18. So the part 15 is set on one face of the part 16 whereby their bridges are congruent, whereupon said arm 21' is congruent with the arm 23', and the arm 22' is congruent with the arm 24'. The parts 15, 16 are then secured by the rivets or screws 25 which are through registered holes 26, 27.

The arms of each of the U-shapes 21, 22 must be convergent towards their distal ends. The arms of each resilient U-shape 23, 24, must be in such angular relation that their distal ends need be bent towards each other, that is, the arms must be bent towards each other so that their distal ends are a shorter distance from each other, so that the entirety of both parts 15 and 16 are congruent. The lens rim contour is of course that which will correctly fit the bezel channel when said frame parts are congruent. Hence on placing the lenses 19, 20 into their respective bezel channels 19', 20', the arms 23" and 24" will be away from the temporal edges of the lenses 19, 20 respectively, as is shown in FIG. 5, or at least will need that the arm 23" be moved somewhat towards the arm 23', and the arm 24" be moved somewhat towards the arm 24', for said lenses to be fully engaged in their respective half-bezels. As a practical suggestion, the arms 23', 23" in the separate piece 16, need be less convergent towards their distal ends than the convergence existing between the arms 21', 21" and the same condition shall exist for the U-shape 24. So after the lenses 19, 20 are set in the part 16 as shown in FIG. 5, the arms 23", 24" are bent towards each other, whereupon the parts 15 and 16 are wholly congruent so that the assembly is then effected by the rivets or screws 30 through the aligned holes 31, 32.

The perimetral contour of the non-resilient part 15 may be of any desired decorative form, in which instance congruity is sought for the rivet holes of part 16 to fit with the corresponding rivet holes in the part 15. The exposed surface of the part 15 may carry decorative elements or surface decoration to cover or include the rivet heads. The semi-rimless frame indicated generally by the numeral 33, is of the type commonly known as the clerical or half-eye type. Here, each half-rim as 34, straddles the lower part of the lens 35 and is associated with a separate non-resilient U-shaped element 36 in the embodiment shown. The half rims are highly desirable in this type of eye-glasses, because the top edge 35' of each lens has no frame rim to interfere with vision. The initial condition of each of the half-bezels 34 is such that its arm is beyond the temporal side of the lens as indicated at 34' so that to effect the assembly, the arms of each U-piece 34 need be bent towards each other to properly engage the lens and afford the screws 38 to be positioned through appropriate aligned holes in the frame parts.

It is evident that upon assembly as set forth, the lenses are securely mounted and the bezels cannot be sprung to release them because of the enclosing and securing shape of the non-resilient frame components 15 and 36. Of course, in part 15, the bridge 17 may be omitted to have two separate parts for association with the frame part 16, in the manner akin to that shown for the modified embodiment of FIG. 9. Also to be noted is that the non-resilient parts may be on either face of the resilient part of the frame structures.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description herein to indicate the scope of this invention.

I claim:

1. In an eyeglass frame of the character described, a member having some resilient quality, comprising a nose piece intermediate and connecting two U-shaped elements, each of which is adapted to straddle a lens and receive it into channel structure along the inside surface of such element, two U-shaped, non-resilient stiff elements, each positioned against a face of one of said resilient U-shaped elements respectively to lie in like position therewith; the arms of each resilient U-shaped element being initially apart somewhat more than the arms of its associated non-resilient U-shaped element so that when a lens of predetermined size and shape is entered into the channel, the arms of said resilient U-shaped element need be brought towards each other to have the lens tightly fitted in said channel and means to secure the arms of the non-resilient U-shaped elements to the arms of their respectively associated resilient elements when the arms of each resilient U-shaped element are brought towards each other to tightly hold the lens; each of the U-shaped non-resilient elements being shaped so as to substantially match the face of its associated U-shaped resilient element when the lens associated with said U-shaped resilient element is tightly held thereby.

2. An eyeglass frame as defined in claim 1, including a nose piece intermediate and connecting the non-resilient U-shaped elements.

3. An eyeglass frame as defined in claim 2, wherein the nose piece and the U-shaped elements of the resilient member are integral and wherein the non-resilient U-shaped elements and their associated nose piece are integral.

4. An eyeglass frame as defined in claim 1, wherein the arms of each resilient U-shaped element are at the nasal and temporal sides respectively of the frame.

5. An eyeglass frame as defined in claim 4, wherein the U-shaped elements are in inverted position when the frame is worn.

6. An eyeglass frame as defined in claim 4, wherein the U-shaped elements are in upright position when the frame is worn.

7. An eyeglass frame as defined in claim 1, wherein the resilient member is of plastic and wherein the non-resilient U-shaped elements are of sheet metal.

8. An eyeglass frame as defined in claim 1, wherein the securing means include pin-receiving holes through the resilient member and a like number of holes through the non-resilient members; the latter holes being in register with the former-mentioned holes when the arms of the respective resilient U-shaped members are brought towards each other to a position where they tightly hold the respective lenses.

References Cited in the file of this patent

UNITED STATES PATENTS

| | | |
|---|---|---|
| 2,155,693 | Tanasso et al. | Apr. 25, 1939 |
| 2,534,748 | Willson | Dec. 19, 1950 |
| 2,555,578 | Davis | June 5, 1951 |

FOREIGN PATENTS

| | | |
|---|---|---|
| 794,129 | France | Feb. 8, 1936 |
| 977,995 | France | Apr. 9, 1951 |
| 1,038,685 | France | Sept. 30, 1953 |